Oct. 28, 1930.      G. H. DAWES ET AL      1,779,422
GASEOUS FUEL MIXING DEVICE
Filed Feb. 23, 1929
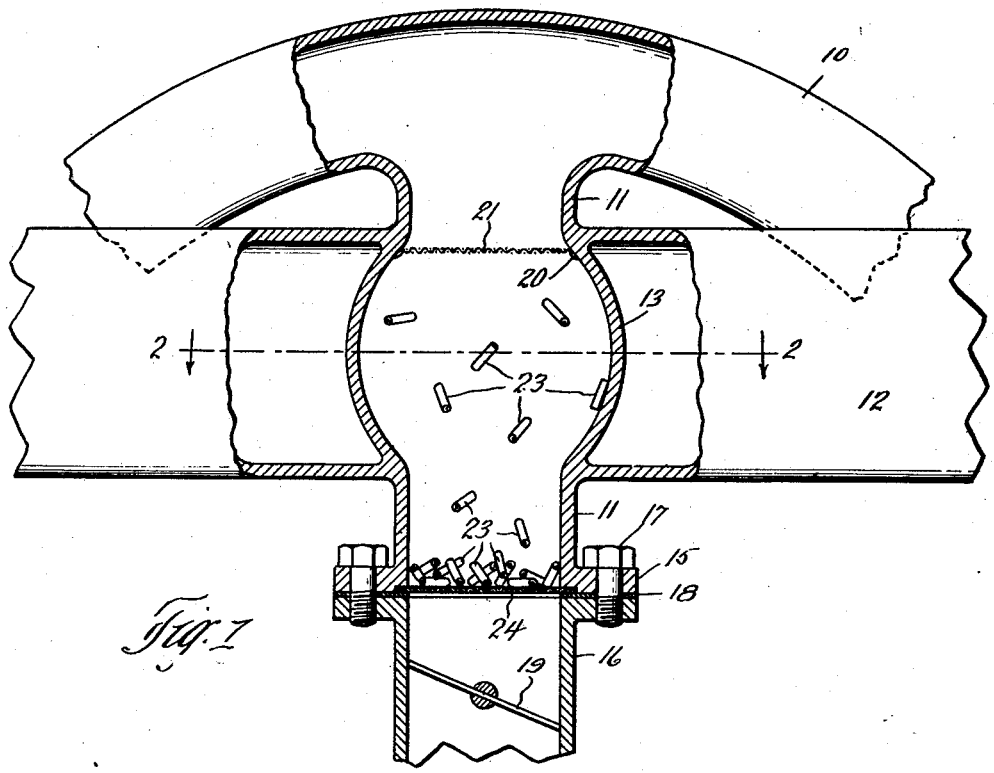
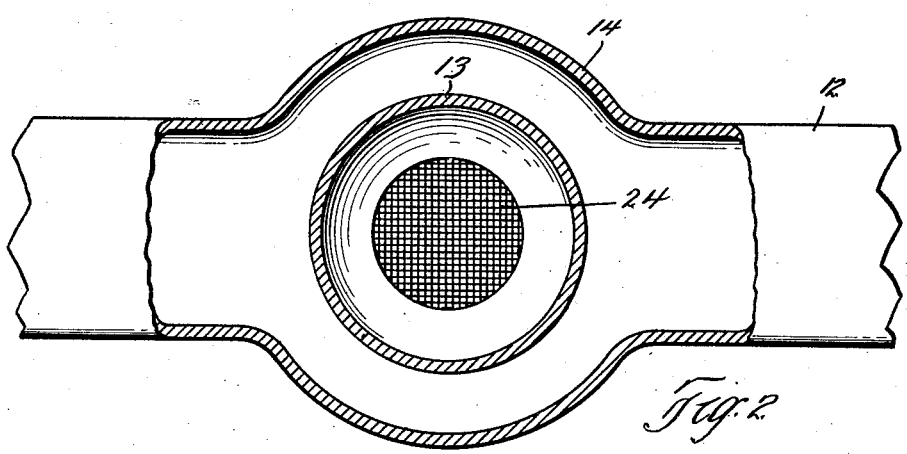
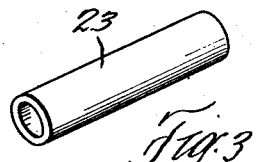
INVENTORS
George H. Dawes
Max C. Lewis
BY
Hull Brock & West
ATTORNEY Patented Oct. 28, 1930

1,779,422

UNITED STATES PATENT OFFICE

GEORGE H. DAWES, OF BRATENAHL, AND MAX C. LEWIS, OF LAKEWOOD, OHIO

GASEOUS-FUEL-MIXING DEVICE

Application filed February 23, 1929. Serial No. 341,907.

This invention relates to gaseous fuel mixing devices for internal combustion engines.

The object of the invention is to provide a chamber through which the fuel is passed from the carburetor where it is thoroughly mixed with the air and heated to a temperature only slightly below its combustion temperature and completely gasified prior to its admission into the combustion chamber of the engine.

A further object is to provide a vaporizer which may be made as part of the exhaust manifold and through which the fuel vapors and air are passed and which is filled with metallic objects which insure thorough mixing of the fuel vapors with the air and intimate contact of the fuel vapors therewith as it passes in tortuous paths therethrough.

In the accompanying drawings Fig. 1 is a side elevation, partly in section, of the central portion of an integrally cast intake and exhaust manifold which includes the vaporizer as an integral part thereof and to which the upper portion of a carburetor is secured; Fig. 2 is a sectional view through the vaporizer and exhaust manifold on the line 2—2 of Fig. 1; Fig. 3 is a perspective view of one of the nipples with which the vaporizer chamber is filled.

In the embodiment of our invention illustrated in the accompanying drawings 10 designates the central portion of an intake manifold for an internal combustion engine. The inlet pipe 11 which leads to the manifold 10 passes through an exhaust manifold 12, which in the form illustrated, is cast integral therewith. The portion of the inlet pipe 11 which is within the exhaust manifold 12 is enlarged in diameter forming a bulb 13 which constitutes the vaporizing chamber for the inflowing gasoline and air mixture. About the bulb 13 the exhaust manifold is enlarged as at 14 so that the passages about the bulb 13 have substantially the same cross sectional area as the rest of the exhaust manifold. The lower end of the inlet pipe 11 is provided with a flange 15 to which a carburetor indicated by reference numeral 16 is secured by bolts 17. Interposed between the carburetor and flange 16 on the intake is a gasket 18 for tightly sealing the joint.

The carburetor 16 is provided with the usual butterfly valve 19 for controlling the amount of fuel which passes into the intake manifold. Only the conventional top portion of a carburetor is illustrated since the carburetor itself forms no part of our invention.

Welded as at 20 or otherwise secured in the top portion of the bulb 13 is a screen 21. The bulb is filled with small tubular members or nipples 23 and across the lower end of the pipe 11 with its edges welded or otherwise secured in a groove in the flange 15 is a second screen 24. The nipples 23 are retained in the bulb by the screens 21 and 24.

In operation after the engine, which may be equipped with our vaporizer, has been run for a short time the bulb 13 and enclosed nipples 23 are heated by the exhaust gases. The fuel vapor and air mixture as it passes through the bulb from the carburetor to the intake manifold is thoroughly mixed on passing through and about the nipples and in taking up heat is expanded or gasified to a point where complete combustion of the same takes place when ignited in the cylinders of the engine. The vapor and air mixture is heated in the bulb 13 to a temperature only slightly below its combustion temperature. By mixing and heating the fuel vapor and air a marked increase in the efficiency of the engine is noted when gasoline is used as the fuel. By the use of this vaporizer kerosene and even a good grade fuel oil may be used in many engines designed particularly for gasoline, since a complete vaporization or gasification of these substances may be brought about.

When kerosene or heavier oils are used an auxiliary gasoline supply tank is provided to furnish fuel for starting the engine, and for running until the engine is hot enough to properly vaporize the heavier fuel in the same way engines particularly designed to burn kerosene are usually operated.

It has been found that small nipples give better results when used as the contact medium for filling the bulb 13 than irregular objects or balls since they do not pack on being continually shaken by the engine and while practically every particle of the gases passing through the bulb will strike the heated metal due to the tortuous paths provided the flow of the air and vapors through the bulb is not retarded to any appreciable extent.

The nipples are made of copper, brass, nickel, aluminium, or any good heat conducting metals which can withstand the high temperatures for a long period of time with a continual flow of air and gases therethrough.

We have also found that the bulb 13 must not be too large or the volume of air and gases passing therethrough will not be sufficient under normal conditions to keep the temperature of the nipples below the combustion temperature of the gas mixture. With the bowl too small there will not be sufficient heat to properly gasify the gasoline or oil vapors.

The size of the inlet to the manifold normally depends on the size of the engine and its calculated gas consumption. When the normal sized inlet for any particular engine is enlarged one inch in diameter where it passes through the exhaust pipe it is found that good results are obtained. Slight variations in this measurement may of course be made without materially impairing the efficiency of the vaporizer.

Having thus described our invention, what we claim is:

1. In combination with the intake and exhaust manifolds of an internal combustion engine, a vaporizer for the fuel comprising an inlet conduit for said intake manifold including a portion passing through said exhaust manifold, the portion of said inlet conduit which is enclosed by the exhaust manifold being partially filled with short metallic tubular members providing tortuous passages for the air and gases through said inlet and means for retaining said members therein.

2. In combination with the intake and exhaust manifolds of an internal combustion engine, a vaporizer for the fuel comprising an inlet conduit for said intake manifold including a portion passing through said exhaust manifold, a mass of tubular members filling a portion of the inlet conduit where it passes through the exhaust manifold and a foraminous wall across the inlet conduit at each end of the mass of tubular members for retaining them therein.

3. In combination with an exhaust manifold of an internal combustion engine, a vaporizer including a hollow pipe member comprising a portion of the fuel intake for said engine extending through said exhaust manifold about which the exhaust gases pass to heat the same, a portion of said pipe where it passes through the exhaust manifold being partially filled with short tubular members through and about which the inlet gases for said engine pass, and foraminous walls across said pipe member for retaining said tubular members therein.

4. In combination with an exhaust manifold of an internal combustion engine, a vaporizer for the fuel including a hollow pipe member comprising a portion of the fuel intake conduit for said engine extending through said exhaust manifold about which the exhaust gases pass to heat the same, the portion of the pipe within the exhaust manifold being enlarged to provide a chamber, a foraminous wall across said pipe at each end of the chamber, said chamber being partially filled with tubular metallic members, about and through which the intake gases pass for thoroughly mixing and heating the same.

In testimony whereof, we hereunto affix our signatures.

GEORGE H. DAWES.
MAX C. LEWIS.